United States Patent Office 2,991,297
Patented July 4, 1961

2,991,297
PROCESS FOR PREPARING SYNTHETIC LUBRICANTS
Stone D. Cooley and Manuel Slovinsky, Corpus Christi, Tex., assignors to Celanese Corporation of America, New York, N.Y., a corporation of Delaware
No Drawing. Filed July 2, 1958, Ser. No. 746,103
5 Claims. (Cl. 260—410.6)

This invention relates to synthetic lubricants and more particularly to ester lubricants adapted to be subjected to elevated temperatures for extended periods. This invention also relates to an improved method for making such ester lubricants.

It is known that esters of polyols with alkanoic acids are useful as lubricants and that esters of polyols, such as trimethylolpropane, trimethylolethane and pentaerythritol which have at least two methylol groups bonded to a single quaternary carbon atom are particularly useful for high temperature stability. However, despite the enhanced thermal stability of such esters, they have not been able to meet the extremely rigorous thermal stability demands of certain applications such as in the lubrication of high performance jet turbine aircraft engines.

It has now been found that this class of thermally stable esters can have even greater thermal stability than heretofore developed and that the full potential thermal stability of these compounds has not been appreciated.

In accordance with one aspect of this invention an ester is provided of at least one alkanoic acid having an average chain length between 4 and 12 carbon atoms with a polyol having a quaternary carbon atom bonded to at least two methylol groups, said ester retaining substantial clarity after being maintained at 600° F. for a period of two days.

In the usual esterification procedure, a strongly acidic esterification catalyst is used in order to reduce the time for the esterification reaction. The esterification catalyst is more strongly acidic than acetic acid and other alkanoic acids and has a higher dissociation constant. The acidic catalyst is used in a small amount, generally about 0.2 percent by weight and the catalyst content of the ester is then further reduced to extremely small concentrations by water washing, alkali treatment and combinations of these treatments.

Prior to this invention, it was considered that the presence of such minute amounts of acidic catalysts could be disregarded and that the thermal degradation properties of esters containing such minute amounts of acidic catalyst were essentially the thermal degradation properties of the esters, themselves.

In accordance with another aspect of this invention, it has been found that the full potential of thermal stability of this class of esters is not reached in the presence of even minute amounts of acidic material having a dissociation constant higher than that of acetic acid.

Esters free of such acidic material are prepared by reaction of the desired alkanoic acid, or mixture of alkanoic acids, with the desired polyol in a reaction mixture containing no acidic material having a higher dissociation constant than acetic acid.

The alkanoic acids used in accordance with this invention are pure compounds or mixtures of compounds having average chain lengths between 4 and 12 carbon atoms and preferably between 5 and 9 carbon atoms. The individual acids may range in chain length from 2 to 18 carbon atoms. Normal acids are preferred, although branched alkanoic acids may also be used, particularly those with no more than two carbon atoms in side chains.

The polyols used are those having at least two, and preferably three methylol groups on a quaternary carbon atom. Among the polyols which may be used are trimethylolpropane, trimethylolethane, neopentyl glycol, pentaerythritol, 2-butyl-2-ethyl-1,3-propanediol and 2,2,4-trimethyl-1,3-pentanediol.

The general procedure for the preparation of the esters of this invention are based on the reaction of the polyol with a slight excess of alkanoic acid with the removal of water by volatilization, preferably in the presence of an azeotroping agent, such as a liquid hydrocarbon.

With trimethylolpropane as the polyol, for example, slightly more than 3 moles of alkanoic acid are required for each mole of polyol, say between about 3.3 and 3.6 moles. From about 2 to about 12 parts by weight of an azeotroping agent, such as xylene, are added per 100 parts of reactant mixture. The azeotroping agent is preferably a hydrocarbon boiling between about 80° and 150° C. Among the preferred azeotroping agents in addition to xylene are toluene, cyclohexane, benzene and mixtures of aliphatic hydrocarbons, such as petroleum naphtha.

The esterification reaction is generally carried out at atmospheric pressure, under reflux conditions at a temperature between about 140° and 350° C. The water is collected overhead as it is formed, together with the xylene azeotroping agent. The reaction is continued, until the hydroxyl content of the reaction mixture is not higher than 0.1% by weight, generally between about 4 and 20 hours.

After completion of the esterification reaction, the pressure is lowered to about 5 to 10 mm. of mercury, absolute and the product is stripped at a temperature up to about 240° C. to remove the xylene and excess acid. The acid content should be reduced to not more than 2% by weight in order to avoid emulsion formation during the subsequent washing steps.

After stripping, the ester is washed with caustic solution and then with sodium chloride solution and finally vacuum stripped to remove water. Other methods of reducing the acid content may be used, such as washing with sodium carbonate solution, stirring with an aqueous slurry of an alkaline material, such as calcium oxide, sodium or potassium carbonate or treatment with an ion exchange resin.

The dehydrated product is then treated with decolorising charcoal and finally filtered through diatomaceous earth.

EXAMPLE I

This example is representative of prior art esters. 1206 parts by weight of trimethylolpropane, 4582 parts by weight of commercial pelargonic acid, 260 parts by weight of toluene and 8 parts by weight of toluene sulfonic acid were heated under reflux conditions at a maximum temperature of 216° C., for 18.5 hours. Water and toluene passed overhead and were collected on a Dean-Stark trap. After the hydroxyl number of the reaction mixture was reduced to about 17.4, the mixture was stripped at a maximum temperature of 140° C. and a minimum pressure of one millimeter of mercury absolute to remove the excess acid and toluene. The ester was clear and had a color below 1 on the color disc scale when tested in accordance with ASTM D155–45T. This ester is identified as "A" below.

402 parts by weight of trimethylolpropane, 1495 parts of commercial pelargonic acid, 3.8 parts of p-toluene sulfonic acid and 170 parts of toluene were heated to a maximum temperature of 225° C. for 8.2 hours with water and toluene and passed overhead, condensed and collected. The pressure was then reduced to 4 mm. of mercury, absolute and the toluene and excess pelargonic acid were distilled off at 200° C.

To 523 parts of the crude ester, prepared in the manner described above, 10 parts of calcium oxide suspended in 40 parts of water was added and the stirred mixture heated to 50–60° C. After one hour, the water was removed at 100° C. and 4 mm. of mercury absolute pressure. 10.4 parts of decolorizing carbon was stirred in during 30 minutes and the product filtered through diatomaceous earth. The amount of finished ester was 472 parts representing a 91% yield based on trimethylolpropane. The efficiency on pelargonic acid was 90.4%. No calcium salt remained in solution as established by flame spectographic analysis. The ester was clear and had a color below 1, measured as above. This ester is identified below as "B."

EXAMPLE II

This example is representative of the ester and the process of this invention.

402 parts by weight of trimethylolpropane, 1566 parts of commercial pelargonic acid and 100 parts of xylene were heated for 10.6 hours at a maximum temperature of 240° C. with water and xylene passing overhead for condensation and collection. The xylene and excess pelargonic acid were then distilled off at 190° C. and 4 mm. of mercury absolute pressure. 1651 parts of crude ester with an acid number of 12.9 was obtained.

To 911 parts by weight of the crude ester, 13 parts of sodium carbonate in 40 parts of water was added. The mixture was heated to 65° C. for 0.8 hour. 15 parts of sodium carbonate was added afterwards to dehydrate along with 10 parts of decolorizing carbon. The mixture was filtered through diatomaceous earth. 787 parts of finished ester was obtained representing an 86% yield based on trimethylolpropane. The ester was clear and had a color below 1, measured as above. This ester is designated below as "C."

The esters, identified above as "A," "B" and "C" were heated in a sealed stainless steel bomb at 600° F. for 48 hours. The results were as follows:

Table I

|  | Ester A | | Ester B | | Ester C | |
| --- | --- | --- | --- | --- | --- | --- |
|  | Before | After | Before | After | Before | After |
| Pour Point, °F | −60 | −20 | −65 | −25 | −65 | −75 |
| Viscosity, SUS: | | | | | | |
| @ 100° F | 116.82 | 87.42 | 112.56 | 80.44 | 110.35 | 105.86 |
| @ 210° F | 42.52 | 38.87 | 42.00 | 38.23 | 41.90 | 41.16 |
| Appearance after treatment | (¹) | (¹) | (²) | (²) | (³) | (³) |

¹ Deposits in bomb and fluid. Fluid—dark brown. Extremely acrid. Musty odor. White emulsion-like deposits.
² Trace of carbon deposits above fluid. Foul odor. Fluid—dark brown.
³ Trace of mushy deposits above fluid. Fluid—deposit free, clear. Brown-amber color.

EXAMPLE III 402 parts by weight of trimethylolpropane, 1287 parts of heptanoic acid and 100 parts of xylene were heated to a maximum temperature of 232° C. for 8.4 hours. Xylene and excess heptanoic acid were then distilled off at 230° C. and 5 mm. of mercury absolute pressure. 1389 parts of crude ester with an acid number of 0.92 was obtained.

The crude ester was washed twice with warm sodium hydroxide (3% aqueous) and then with 3% aqueous sodium chloride until the spent wash liquid was neutral. The ester was stripped at 100° C. and 4 mm. of mercury absolute pressure after the addition of 3 parts of sodium carbonate. The product was treated with 7 parts of decolorizing carbon during 0.25 hour and then filtered through diatomaceous earth. 671 parts of finished ester was obtained, representing an overall yield of 95.5% based on trimethylolpropane. The efficiency of heptanoic acid was 95.5%. The ester was clear and had a color below 1, measured as above. This ester is identified below as "D."

EXAMPLE IV

Valeric acid and pelargonic acid were employed to obtain an average C₇ acid. The trimethylolpropane esters were prepared by means of a two stage process, charging first pelargonic acid and, when most of this acid had reacted, 10 mole percent excess (based on the total amount of acid) of valeric acid was charged. In the first reaction, 402 parts of trimethylolpropane, 711 parts of pelargonic acid and 66 parts of xylene were heated at a maximum temperature of 259° C. for 2.4 hours until an acid number of 2.3 was obtained. 55 parts of valeric acid was then added and the reaction continued for another 11.1 hours. Excess valeric acid and xylene were distilled at 220° C. and 5 mm. of mercury absolute pressure. The amount of crude ester was 1355 parts and its acid number was 2.1.

719 parts of this ester was washed with warm 3% aqueous solutions of sodium hydroxide and sodium chloride, successively, as above. The ester was dehydrated at 100° C. and 4 mm. of mercury absolute pressure after the addition of 2 parts of potassium carbonate. 7 parts of decolorizing carbon was then charged and after 0.5 hour of stirring the product was filtered through diatomaceous earth. The amount obtained was 690 parts, representing a 92.1% yield based on trimethylolpropane; the acid efficiency was 96.6%. The ester was clear and had a color below 1, measured as above. This ester is identified below as "E."

Esters "D" and "E" were heated in bombs at 600° F. for 48 hours as described above. The results were as follows:

Table II

|  | Ester D | | Ester E | |
| --- | --- | --- | --- | --- |
|  | Before | After | Before | After |
| Pour Point, °F | −85 | −90 | −80 | −80 |
| Viscosity, SUS: | | | | |
| @ 100° F | 77.00 | 80.72 | 85.20 | 84.96 |
| @ 210° F | 37.83 | 38.23 | 38.78 | 38.75 |
| Appearance after treatment | (¹) | (¹) | (²) | (²) |

¹ Slight carbon ring above fluid. Bomb spotless. Fluid clean. Very light tan color.
² Spotless. Fluid—very light greenish-tan.

It is to be understood that the foregoing detailed description is given merely by way of illustration and that many variations may be made therein without departing from the spirit of our invention.

Having described our invention what we desire to secure by Letters Patent is:

1. Method of preparing a trialkanoic acid ester of trimethylolpropane having three methylol groups on a quaternary carbon atom, having alkanoic acid chain lengths averaging between 5 and 9 carbon atoms, which comprises reacting an alkanoic acid having said average chain length with said trimethylolpropane in a reaction mixture containing no other carboxylic acids and containing no acidic material having a dissociation constant higher than that of acetic acid.

2. The method of claim 1 wherein from about 3.3 to about 3.6 moles of alkanoic acid is present in the reaction mixture for each mole of trimethylolpropane.

3. Method of preparing a triester of at least one alkanoic acid having an average chain length between 5 and 9 carbon atoms and trimethylolpropane having three methylol groups on a quaternary carbon atom which comprises reacting said alkanoic acid and said trimethylolpropane, under reflux conditions, at a temperature between about 140° and 350° C. in a reaction mixture containing an azeotrope agent for water but containing no acidic material having a dissociation constant higher than that of acetic acid.

4. The method of claim 3 wherein said reaction is continued until the hydroxyl content of the reaction mixture is not higher than 0.1% by weight.

5. The method of claim 3 wherein said reaction mixture is stripped after completion of the reaction to an acid content of not more than 2% by weight.

References Cited in the file of this patent

UNITED STATES PATENTS

| | | |
|---|---|---|
| 2,369,429 | Boissonou | Feb. 13, 1945 |
| 2,507,560 | De Groote | May 16, 1950 |
| 2,558,025 | Wicks | June 26, 1951 |
| 2,563,609 | Matuszak | Aug. 7, 1951 |
| 2,686,766 | Silverstein | Aug. 17, 1954 |
| 2,783,270 | Polly et al. | Feb. 26, 1957 |